Figure 1:
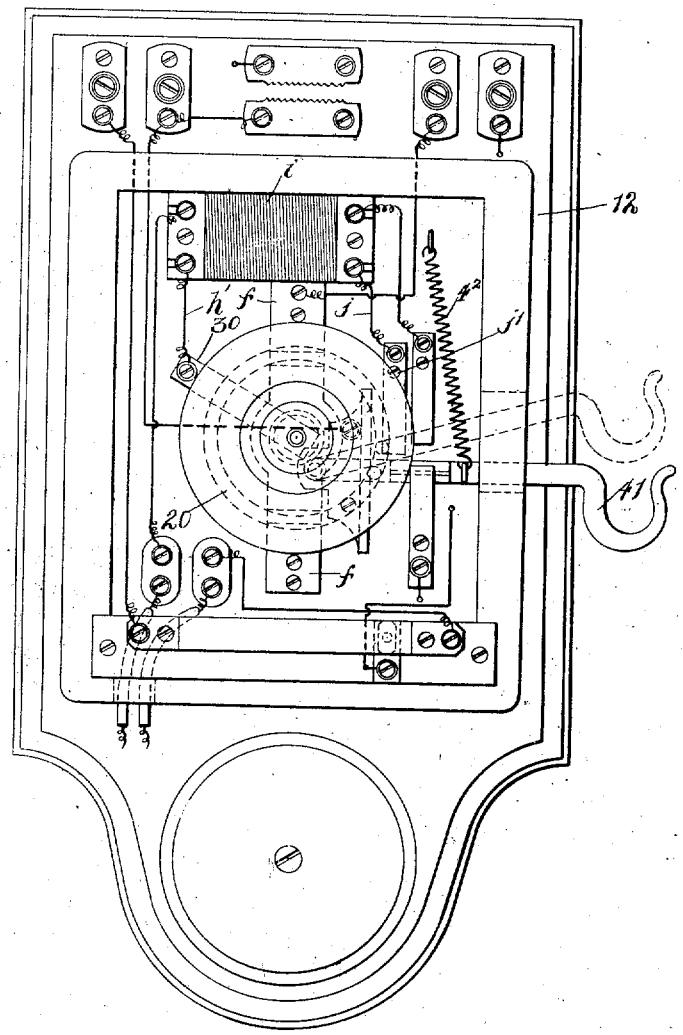

No. 11,719. Reissued Feb. 21, 1899.

J. T. GENT, A. W. STAVELEY & I. H. PARSONS.

TELEPHONE.

(Application filed Oct. 26, 1897.)

2 Sheets—Sheet 1.

Witnesses
J. Weir
Robert Weir

Inventors
John T. Gent, Alwyn W. Staveley and Isaac H. Parsons
By Chas. A. Buckles, their Atty No. 11,719. Reissued Feb. 21, 1899.

J. T. GENT, A. W. STAVELEY & I. H. PARSONS.

TELEPHONE.

(Application filed Oct. 26, 1897.)

2 Sheets—Sheet 2.

Witnesses:
J. Weir
Robert Weir

Inventors
John T. Gent, Alwyn W. Staveley and Isaac H. Parsons by Chas. E. Burkes their Atty.

UNITED STATES PATENT OFFICE.

JOHN THOMAS GENT, ALWYN WALTER STAVELEY, AND ISAAC HARDY PARSONS, OF LEICESTER, ENGLAND.

TELEPHONE.

SPECIFICATION forming part of Reissued Letters Patent No. 11,719, dated February 21, 1899.

Original No. 584,868, dated June 22, 1897. Application for reissue filed October 26, 1897. Serial No. 656,476.

*To all whom it may concern:*

Be it known that we, JOHN THOMAS GENT, ALWYN WALTER STAVELEY, and ISAAC HARDY PARSONS, subjects of the Queen of Great Britain, and residents of Leicester, in the county of Leicester, England, have invented certain new and useful Improvements in Telephones, (which have been patented in England, No. 20,415, dated November 11, 1892,) of which the following is a specification.

In that class of telephones in which as now commonly used granulated carbon is employed as a variable resistance or microphonic medium through which a current of electricity passes from a source of current generation it has been found in practice that the particles of the carbon settle and pack together into a common mass of inert material incapable of maintaining the desirable range of variation in resistance. Our invention relates to means by which this difficulty may be overcome, and has for its object the provision of apparatus whereby the particles or granules of the material constituting the variable resistance are subjected to a movement causing a gradual and systematic relative change of position of said particles to each other, thereby maintaining a uniform separation of said particles or granules throughout the mass of the same. In one instance it has been sought to attain this object by the adoption of mechanism whereby a violent jarring or shaking rising-and-falling movement is imparted to the microphone, tending to disturb the particles in the lines of such movement. In a second instance a horizontally-disposed transmitter having a series of recesses arranged around and through the tubular wall of its mouthpiece filled with granular variable resistant and covered with diaphragms has been made capable of a limited oscillation upon its axis, the result of which is to shift the filling in such recesses as can be carried past the vertical diameter bodily from one side to the other of the recess without any very effective disturbance, while as to the recesses which do not pass such diameter the disturbance of the particles will entirely depend upon the vigor and sharpness of the oscillations imparted.

One feature of our invention consists in arranging the transmitter upon a horizontally-trending axis and in a bearing in which it may be given complete rotations upon said axis and placing the granular variable resistant in a narrow discoidal chamber parallel with the diaphragm and at right angles to the axis of rotation, on each side of which it extends, so that as the transmitter is turned the uppermost grains shall constantly slide or tumble down the inclined surface or talus produced by such turning to the foot, thus insuring a thorough and uniform shifting, change of relations, and lightening up of the mass of particles.

A further feature of our invention is that in order to render the periodic disturbance or shifting of the loose particles in a microphone independent of the personal equation—that is, of the recollection or volition of the subscriber—and make certain that it shall take place notwithstanding inattention or lapses of thought on his part, we connect the movable microphone-case to a normal movable instrumentality of the telephone apparatus regularly and necessarily actuated in the operation of the telephone for effectuating the service thereof, so as to be automatically moved whenever the telephone is used, and as the most convenient means to that end have indicated the movable telephone-support or switch-lever upon which the receiver is suspended when the apparatus is not in use.

Figure 2:
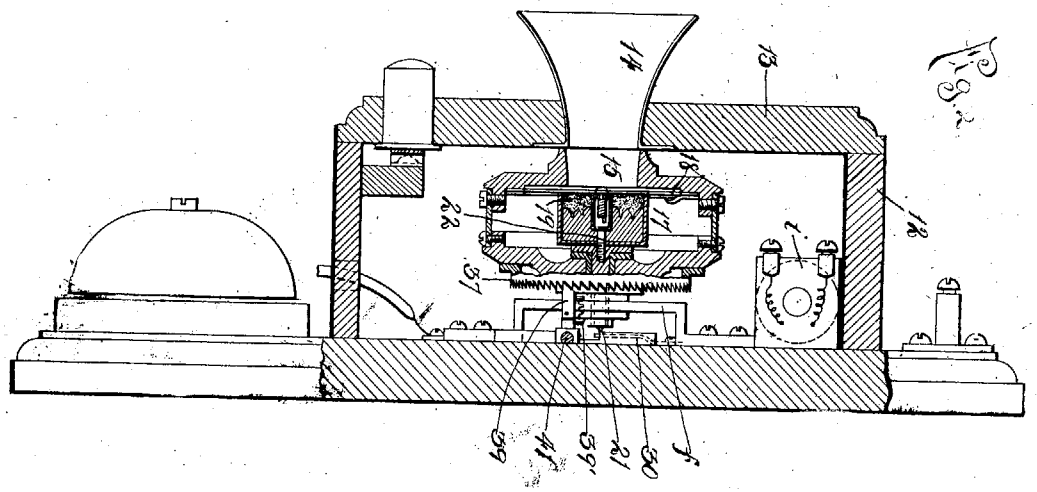
Figure 3:
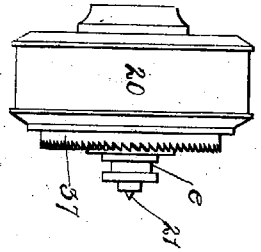

In the drawings, Figure 1 is an elevation of a telephone-transmitter provided with a microphone adapted to be rotated, the front of the casing of the apparatus being removed. Fig. 2 is a side elevation, partly in section, of the apparatus; and Fig. 3 is a side elevation of the casing containing the microphone detached.

The transmitter-box containing the apparatus as a whole is designated at 12, and to it is secured the cover 13, holding the mouthpiece 14, the inner open end of which coincides with the concentrating-orifice 15 in the cap 16 of the microphone case or receptacle 17, containing the mass of granulated conducting material 19, which constitutes the variable-resistance medium. The diaphragm 18 extends across the front of the circular case or receptacle 17 and is held by the cover 16, forming, with the back plate or carbon electrode *a* and ordinary surrounding ring of felt *b*, a narrow discoidal chamber *c*, in which the granular variable resistant is placed in a free state. The case 17, comprising the cap 16 and body part 20 and carrying the diaphragm and microphone, is provided with a journal *e*, as shown in Fig. 3, concentric with its axis, and is pivotally and axially mounted thereby in a horizontally-trending bearing in a bracket *f*, extending from the back board of the casing. Through the center of the journal, but insulated therefrom by the substance *e'*, passes the pin 21, which at its outer end is pointed and bears upon a spring 30, connected by a wire *h'* with the primary winding of an induction-coil *i*, the said primary winding being connected by a wire *j* with a contact-spring *j'*, against which the pivoted switch-lever 41, upon which the receiver is suspended when the telephone is out of use, is adapted to come in contact when the said lever is in the position indicated by dotted lines in Fig. 1 owing to the receiver being removed therefrom.

The pin 21 is electrically connected with the diaphragm 18 through the microphone, the said diaphragm being placed in electrical connection with the body 20 of the receptacle 17 through the cover 16, mechanically and electrically connected with said body.

The microphone is electrically connected with the pin 21 by the screw 22, and this also forms the mechanical connection between these parts.

On the body part 20 of the case or retaining-receptacle 17 is an annular ratchet-toothed rack 37, engaged by a pawl 39, pivoted to a stud on the switch-lever. This pawl is held up by a spring 39', and the arrangement is such that when the receiver is lifted from the hook of the lever this lever will move up into position shown in dotted lines, Fig. 1, under the action of the spring 42, and the pawl will ride freely over the teeth of the rack without effect by reason of its pivotal connection; but when the receiver is hung on the hook of the lever 41 this lever will fall, and the pawl being braced when moved downward will engage the rack and turn the body 20 one step, and thus the body, with the containing-receptacle and microphone, will be turned step by step, one movement taking place for each depression of the switch-lever.

The circuit of the primary winding of the induction-coil is completed through the switch-lever 41, the pawl 39, the ratchet-toothed rack 37, and the body 20.

The secondary winding of the induction-coil is arranged in the line-circuit in any well-known manner not necessary to be described herein.

It will be observed that for the purpose of facilitating the automatic rotation of the microphone and its case when the rotation is accomplished automatically the mouthpiece is made separate therefrom and simply alined with the concentrating-orifice of said case.

It is evident that by rotating the receptacle the granules or particles of the mass of variable-resistant conducting material are made to undergo a continual change in their relative position, this change being gradual from the center to the periphery and from the periphery to the center as the particles are carried up by the rotation of the receptacle—that is, assuming that the particles have found their normal talus during the interval while the telephone is out of use, the first fractional rotation of the microphone-case will carry them beyond it and they will immediately begin to slide over each other to reassume such talus, those nearest the middle of the slope reaching or approximating the foot or lower outer periphery first and those at and toward the top or upper outer periphery sliding downward to or past the middle, while concurrently there will be a general movement, more or less pronounced, of the major part of the entire mass in the same direction to readjust the particles to the new lines of slip, tending to work the central particles outward toward the periphery. In the continued use of the telephone the microphone-case is completely revolved, and by this means all of the lower strata of the particles are brought to the surface in succession gradually and continuously and an average condition of looseness and free separation is constantly maintained from the center to the periphery of the mass of conducting material, thus counteracting the tendency of the particles or granules to settle and pack together into an inert, closely-assembled, and dense mass.

The effect of the rotary motion of the microphone-case, besides keeping the particles in a favorable condition of increasing separation toward the periphery in all radial directions from the center and in the lines of the talus, thereby preventing packing, is also to permit expansion of the particles in all directions when heated by the passage of the current, this heating of the particles heretofore being also a cause of packing.

Whenever the term "conducting material" is employed throughout the specification and claims, we do not intend thereby to limit ourselves of necessity to the use of material commonly so distinguished; but we desire to be understood as employing this term to designate any kind or character of material which may be suitable as a variable-resistance medium through which the current passes.

Having thus described our invention, what we claim as new therein, and desire to secure by Letters Patent, is—

1. In a telephone, the combination with the diaphragm of a variable-resistance device consisting of suitable conducting material in a granulated or comminuted state, a movable containing or holding receptacle for said material, and means connecting said receptacle with a normal movable instrumentality of the telephone apparatus, whereby said receptacle is automatically actuated whenever said instrumentality is operated in effectuating the service of the telephone.

2. In a telephone, the combination of a microphone-case axially pivoted in a horizontally-trending bearing, so as to be capable of accomplishing complete rotations therein, a back plate or electrode carried by said case, a diaphragm secured in said case in such manner as to leave a narrow discoidal chamber between it and said first-recited electrode transverse to the axis of rotation of the case, a variable-resistance filling of granular conducting material loosely disposed in said chamber, a normal movable instrumentality of the telephone apparatus regularly and necessarily actuated in effectuating the service thereof, and mechanism connecting said instrumentality with the microphone-case in such manner as to automatically rotate the latter whenever the apparatus is used.

3. In a telephone, the combination with the diaphragm, of a variable-resistance device consisting of suitable conducting material in a granulated or comminuted state, a movable containing or holding receptacle for said material, a movable telephone-support and intermediate connections between said support and the containing or holding receptacle whereby the latter is moved when the telephone is removed from or replaced upon the support.

4. In a telephone, the combination with the diaphragm, of a variable-resistance device consisting of suitable conducting material in a granulated or comminuted state, a pivotally or axially mounted containing or holding receptacle for said material, a movable telephone-support and intermediate connections between said support and the containing or holding receptacle whereby the latter is rotated when the telephone is removed from or replaced upon the support.

In testimony whereof we affix our signatures in presence of witnesses.

JOHN THOMAS GENT.
ALWYN WALTER STAVELEY.
ISAAC HARDY PARSONS.

Witnesses to signature of John Thomas Gent:

E. P. SKINNER,
W. GEACH.

Witnesses to signatures of Alwyn Walter Staveley and Isaac Hardy Parsons:

FRED FELLOWES WIGGINS,
GEORGE WILLIAM COLTMAN.